US011417129B2

(12) United States Patent
Pham et al.

(10) Patent No.: US 11,417,129 B2
(45) Date of Patent: Aug. 16, 2022

(54) OBJECT IDENTIFICATION IMAGE DEVICE, METHOD, AND COMPUTER PROGRAM PRODUCT (71) Applicant: KABUSHIKI KAISHA TOSHIBA, Tokyo (JP)

(72) Inventors: Quoc Viet Pham, Yokohama Kanagawa (JP); Tatsuo Kozakaya, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 103 days.

(21) Appl. No.: 16/286,407

(22) Filed: Feb. 26, 2019

(65) Prior Publication Data
US 2019/0392270 A1 Dec. 26, 2019

(30) Foreign Application Priority Data

Jun. 21, 2018 (JP) .............................. JP2018-118089

(51) Int. Cl.
*G06T 7/73* (2017.01)
*G06N 20/00* (2019.01)
(Continued)

(52) U.S. Cl.
CPC ......... *G06V 30/194* (2022.01); *G06K 9/6228* (2013.01); *G06K 9/6288* (2013.01);
(Continued)

(58) Field of Classification Search
CPC ...... G06K 9/46; G06K 9/4671; G06K 9/6288; G06K 9/629; G06K 9/66; G06K 9/00624;
(Continued)

(56) References Cited

U.S. PATENT DOCUMENTS

2010/0027892 A1\* 2/2010 Guan ................. G06K 9/00355
382/203
2011/0052063 A1\* 3/2011 McAuley ........... G06K 9/00684
382/180
(Continued)

FOREIGN PATENT DOCUMENTS

JP 2010-262601 A 11/2010
JP 2018-205800 12/2018

OTHER PUBLICATIONS

Everingham, M., Gool, L. Van, Williams, C.K., Winn, J., and Zisserman, A. "The Pascal Visual Object Classes (VOC) Challenge." IJCV, 2010.
(Continued)

*Primary Examiner* — Kenny A Cese
(74) *Attorney, Agent, or Firm* — Knobbe, Martens, Olson & Bear LLP (57) ABSTRACT According to one embodiment, an image analysis device includes one or more processors configured to receive input of an image; calculate feature amount information indicating a feature of a region of the image; recognize a known object from the image on the basis of the feature amount information, the known object being registered in learning data of image recognition; recognize a generalization object from the image on the basis of the feature amount information, the generalization object being generalizable from the known object; and output output information on an object identified from the image as the known object or the generalization object.

8 Claims, 9 Drawing Sheets (51) Int. Cl.
*G06V 10/40* (2022.01)
*G06V 10/75* (2022.01)
*G06V 20/00* (2022.01)
*G06K 9/62* (2022.01)
*G06V 30/194* (2022.01)

(52) U.S. Cl.
CPC .............. *G06N 20/00* (2019.01); *G06T 7/73* (2017.01); *G06V 10/40* (2022.01); *G06V 10/751* (2022.01); *G06V 20/00* (2022.01); G06T 2207/20081 (2013.01); *G06V 10/759* (2022.01)

(58) Field of Classification Search
CPC ................ G06K 9/6202; G06K 9/6228; G06T 2207/20081; G06T 7/73; G06F 16/285; G06N 20/00; G06V 30/194; G06V 10/40; G06V 10/751; G06V 20/00; G06V 10/759
See application file for complete search history.

(56) References Cited

U.S. PATENT DOCUMENTS

| | | | |
|---|---|---|---|
| 2012/0063674 A1 | 3/2012 | Yano | |
| 2013/0036438 A1* | 2/2013 | Kutaragi | H04N 21/4821 725/38 |
| 2014/0149376 A1* | 5/2014 | Kutaragi | G06F 16/5854 707/706 |
| 2014/0289323 A1* | 9/2014 | Kutaragi | G06F 16/434 709/206 |
| 2015/0248586 A1* | 9/2015 | Gaidon | G06K 9/00711 382/103 |
| 2017/0091671 A1* | 3/2017 | Mitarai | G06F 16/285 |
| 2017/0270389 A1* | 9/2017 | Skaff | G06K 9/6277 |
| 2017/0330059 A1* | 11/2017 | Novotny | G06K 9/00664 |
| 2018/0349748 A1 | 3/2018 | Pham | |
| 2019/0095716 A1* | 3/2019 | Shrestha | G08B 21/187 |

OTHER PUBLICATIONS

LeCun, et al. "Backpropagation Applied to Handwritten Zip Code Recognition," Neural computation, 1989.
Li, et al. "Fully Convolutional Instance-aware Semantic Segmentation," IEEE Conference on Computer Vision and Pattern Recognition (CVRR) 2017.
Ren, et al. "Faster R-CNN: Towards Real-Time Object Detection with Region Proposal Networks," Neural Information Processing Systems (NIPS) 2015.
Akiyama et al., "Generic Object Recognition by a Specific Object Recognition Method Using a Large Number of Images on the Web", IPSJ SIG Technical Report, Information Processing Society of Japan (2010), Jun. 15, 2020, vol. 2010-CVIM-172, No. 11, pp. 1-8.

\* cited by examiner

OBJECT IDENTIFICATION IMAGE DEVICE, METHOD, AND COMPUTER PROGRAM PRODUCT

CROSS-REFERENCE TO RELATED APPLICATIONS

This application is based upon and claims the benefit of priority from Japanese Patent Application No. 2018-118089, filed on Jun. 21, 2018; the entire contents of which are incorporated herein by reference.

FIELD

Embodiments described herein relate generally to an image analysis device, an image analysis method, and a computer program product.

BACKGROUND

Conventionally, recognizing a person or an object from an image has been known. For example, use of a convolution neural network (CNN) for image recognition is known.

It is however difficult to recognize unknown objects other than known objects which are registered in learning dataset.

DETAILED DESCRIPTION

According to one embodiment, generally, an image analysis device includes one or more processors configured to receive input of an image; calculate feature amount information indicating a feature of a region of the image; recognize a known object from the image on the basis of the feature amount information, the known object being registered in learning data of image recognition; recognize a generalization object from the image on the basis of the feature amount information, the generalization object being generalizable from the known object; and output output information on an object identified from the image as the known object or the generalization object.

Hereinafter, an embodiment of an image analysis device, an image analysis method, and a computer program product will be described in detail with reference to the accompanying drawings.

First, an exemplary functional configuration of an image analysis device 100 of the embodiment will be described.

Exemplary Functional Configuration

Figure 1:
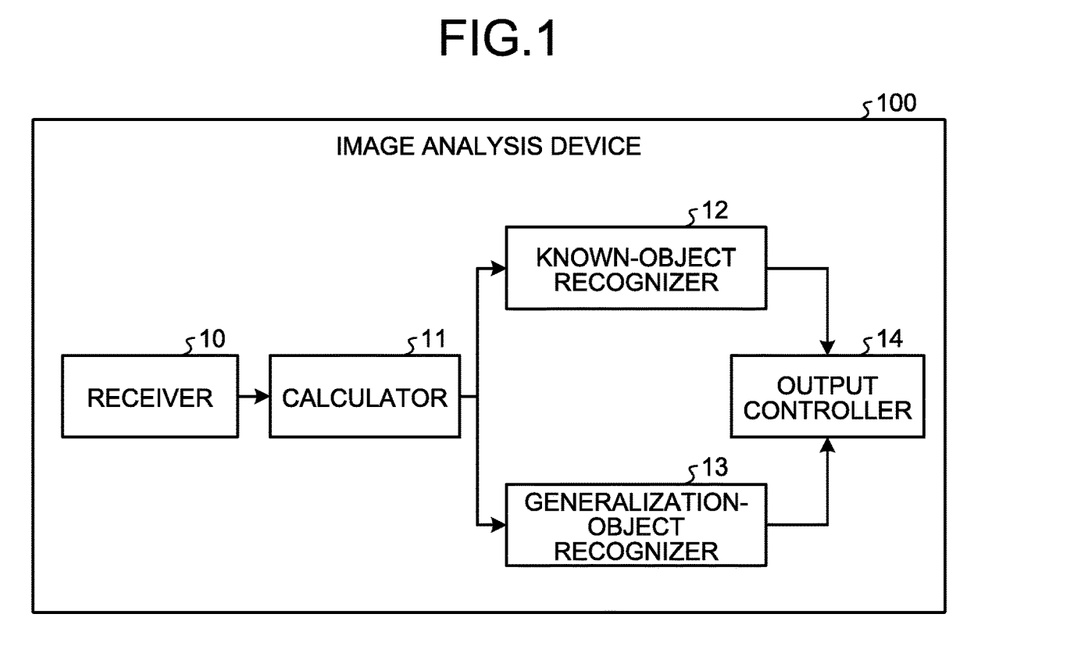
FIG. 1 is a diagram illustrating an exemplary functional configuration of an image analysis device of an embodiment.

FIG. 1 is a diagram illustrating an exemplary functional configuration of the image analysis device 100 of the embodiment. The image analysis device 100 of the embodiment includes a receiver 10, a calculator 11, a known-object recognizer 12, a generalization-object recognizer 13, and an output controller 14.

The receiver 10 receives input of an image.

The calculator 11 calculates feature amount information indicating the features of a region of the image.

The known-object recognizer 12 recognizes a known object, registered in the learning data of image recognition, from the image on the basis of the feature amount information. The feature amount information refers to, for example, a feature amount map representing the feature amount of each pixel. In the present embodiment, the feature amount information is exemplified by the feature amount map.

The generalization-object recognizer 13 recognizes a generalization object (unknown object) generalizable from the known object, from the image on the basis of the feature amount information.

The output controller 14 outputs output information on an object identified from the image as the known object or the generalization object.

Figure 2:
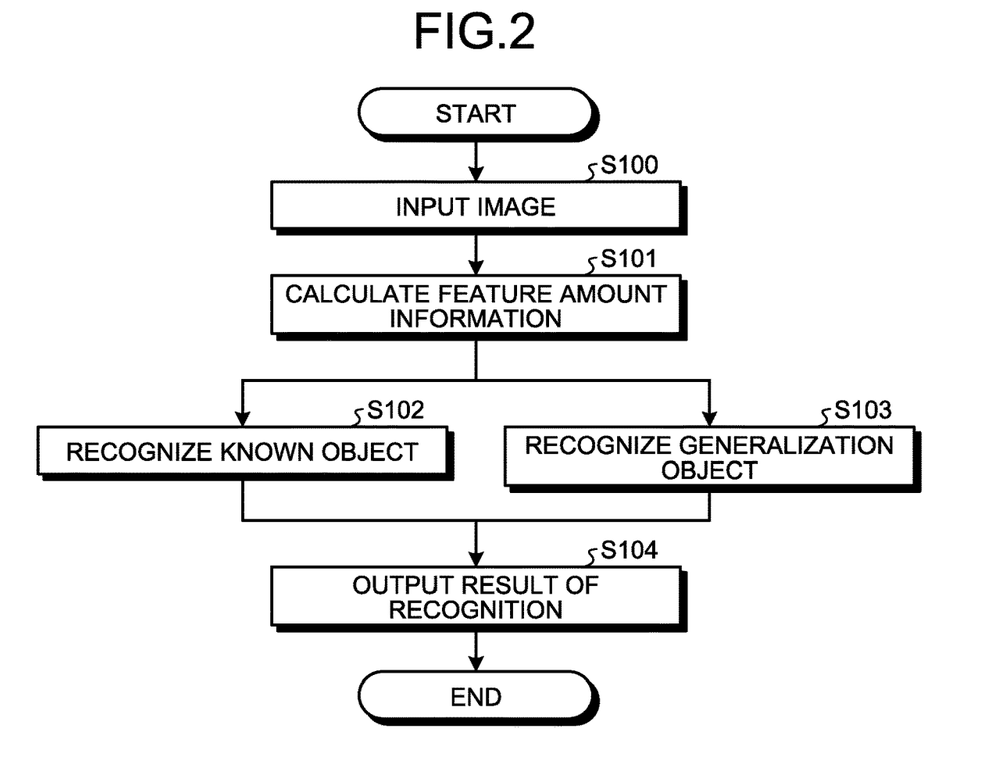
FIG. 2 is a diagram illustrating an exemplary image analysis method of the embodiment.

FIG. 2 is a diagram illustrating an exemplary image analysis method of the embodiment. First, the receiver 10 receives an image input (step S100).

Next, the calculator 11 calculates a feature amount map as the feature amount information (step S101). The feature amount map may be of any type.

Figure 3:
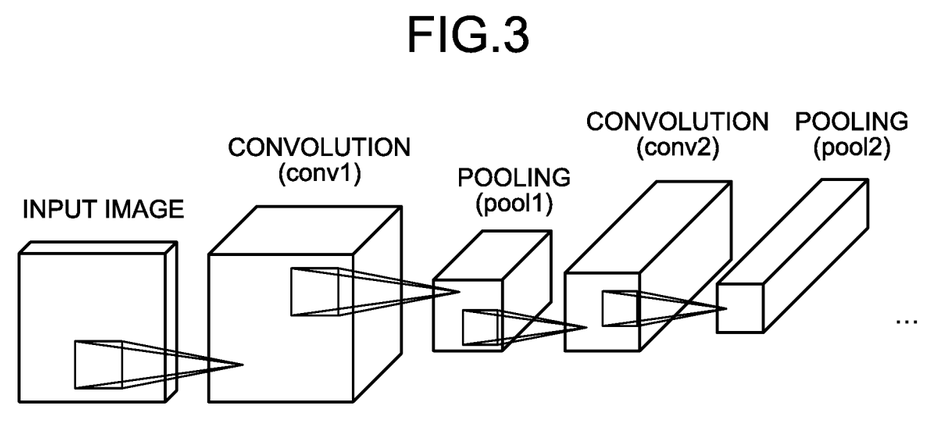
FIG. 3 is a diagram illustrating an exemplary calculation method of feature amount information of the embodiment.

FIG. 3 is a diagram illustrating an exemplary calculation method of feature amount information of the embodiment. In the example of FIG. 3, the feature amount map is calculated using a convolution neural network (for example, see LeCun et al. "Backpropagation applied to handwritten zip code recognition", Neural computation, 1989). Through repetition of convolution and pooling as illustrated in FIG. 3, the feature amount map representing the features of the region of the input image is calculated.

Returning to FIG. 2, the known-object recognizer 12 recognizes a known object from the image on the basis of the feature amount information (for example, feature amount map) calculated in step S101 (step S102). The known object refers to an object registered in the learning data of the image recognition.

Figure 4:
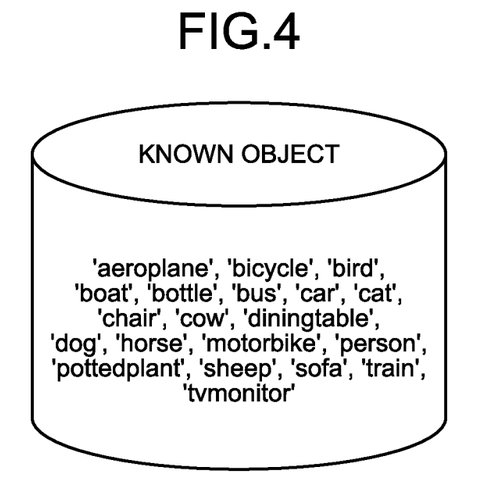
FIG. 4 is a diagram illustrating exemplary known objects registered in learning data of the embodiment.

FIG. 4 is a diagram illustrating exemplary known objects registered in the learning data of the embodiment. FIG. 4 shows exemplary learning data being Pascal VOC dataset (for example, see M. Everingham, L. Van Gool, C. K. Williams, J. Winn, and A. Zisserman, "The pascal visual object classes (voc) challenge", IJCV, 2010). In this example, objects of 20 categories, as illustrated in FIG. 4, are recognized as known objects.

Exemplary shapes of recognized known objects will now be described.

Figure 5A:
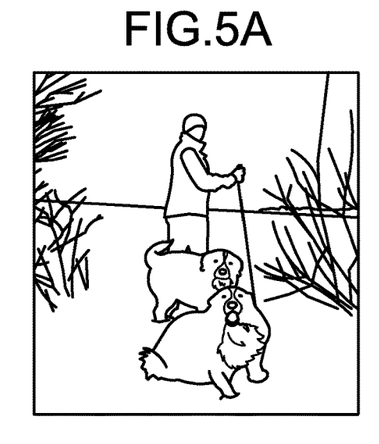
FIG. 5A is a diagram illustrating an exemplary input image of the embodiment.

FIG. 5A is a diagram illustrating an exemplary input image of the embodiment. FIG. 5A shows an exemplary input image showing a person and two dogs. In the present embodiment, the person is a known object in a person category, and the dogs are known objects in a dog category.

Figure 5B:
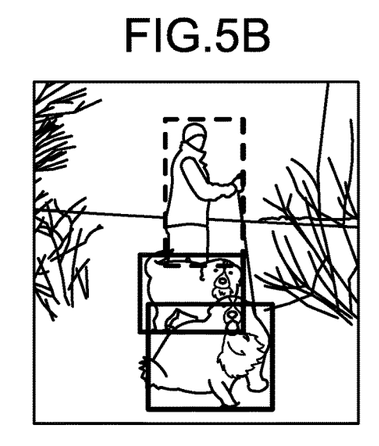
FIG. 5B is a diagram illustrating a first example of recognized known objects of the embodiment.

FIG. 5B is a diagram illustrating a first example of recognized known objects of the embodiment. In FIG. 5B, the known objects (person and dogs) are recognized from the input image illustrated in FIG. 5A by bounding boxes surrounding the known objects. For example, the known-object recognizer 12 can recognize the known objects from the image by the bounding boxes surrounding the known objects, by object detection method as described in Ren et al., "Faster R-CNN: Towards Real-Time Object Detection with Region Proposal Networks", Neural Information Processing Systems (NIPS), 2015.

Figure 5C:
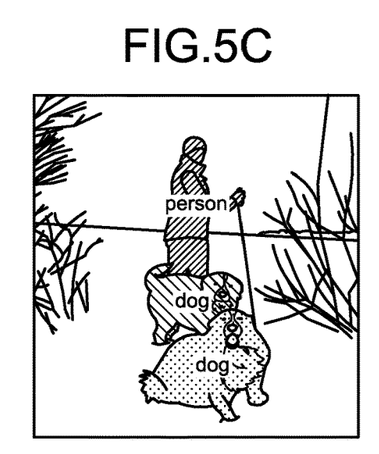
FIG. 5C is a diagram illustrating a second example of recognized known objects of the embodiment.

FIG. 5C is a diagram illustrating a second example of recognized known objects of the embodiment. In FIG. 5C, the known objects (person and dogs) are recognized from the input image, as illustrated in FIG. 5A, by masks on the areas of the known objects. For example, the known-object recognizer 12 can recognize the known objects from the image by the masks (segmentation masks) on the areas of the known objects, by instance segmentation method as described in Li et al., "Fully Convolutional Instance-aware Semantic Segmentation", IEEE Conference on Computer Vision and Pattern Recognition (CVPR), 2017.

Recognition method for generalization objects by the generalization-object recognizer 13 is similar to the methods in FIG. 5B and FIG. 5C.

Returning to FIG. 2, the generalization-object recognizer 13 recognizes a generalization object which is generalizable by combining the known objects registered in the learning data, on the basis of the feature amount information calculated in step S101 (step S103). Generalization objects (unknown objects) refer to objects not registered in the learning data. Generalization objects are generalizable from the features (such as shape) of known objects. In other words, a generalization object is a set of unknown objects generalizable from the features of known objects. Herein, generalization refers to generalizability of feature amounts learned from the learning data of known objects.

The present embodiment describes shape as the features of known objects, by way of example. However, the features of known objects may be color or texture.

Figure 6:
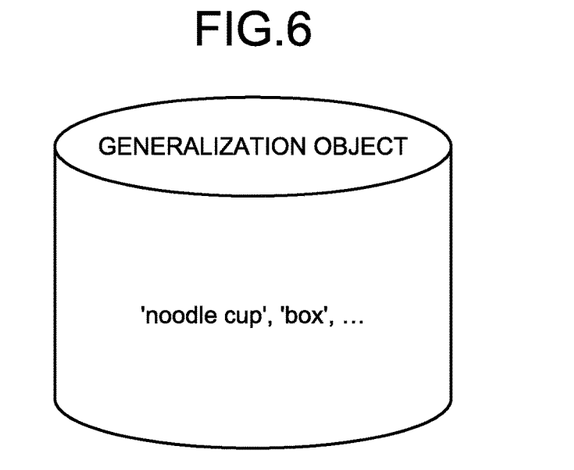
FIG. 6 is a diagram illustrating an example of generalization object generalizable from the known objects in FIG. 4.

FIG. 6 is a diagram illustrating an example of a generalization object generalizable from the known objects in FIG. 4. FIG. 6 illustrates a generalization object (unknown object) different from the known objects in 20 categories registered in the learning data illustrated in FIG. 4, but recognizable by combining the shapes of the known objects. FIG. 6 illustrates a noodle cup shape and a box shape as an example of the generalization object.

Figure 7:
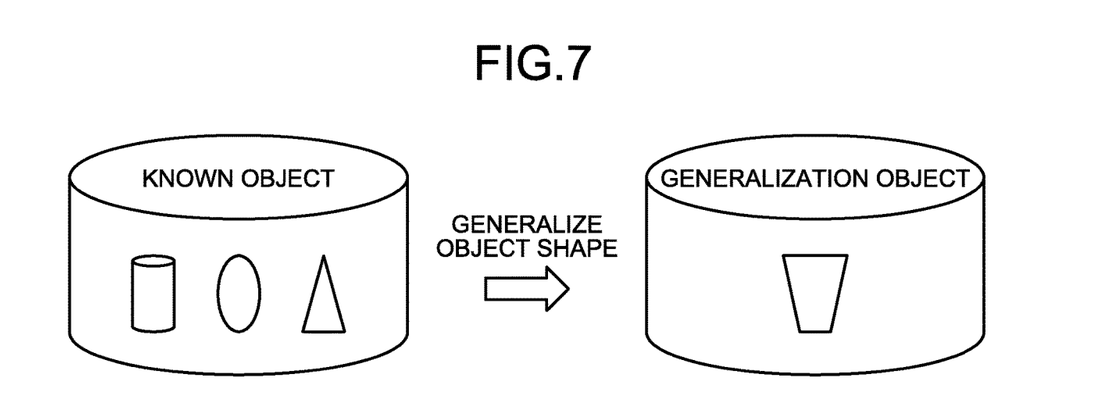
FIG. 7 is a diagram illustrating an exemplary shape of a generalization object that is generalizable from the shapes of known objects of the embodiment.

FIG. 7 is a diagram illustrating an exemplary shape of a generalization object generalizable from the shapes of the known objects of the embodiment. The generalization-object recognizer 13 recognizes, for example, a trapezoid (such as a noodle cup shape) object as the generalization object on the basis of the combination of the cylindrical and triangular shapes of the known objects.

The generalization-object recognizer 13 can learn image recognition from the learning dataset where the known-object recognizer 12 learns image recognition. One of such learning methods is described. First, the generalization-object recognizer 13 not categorizes objects in the learning image of the learning dataset into known object categories but integrates the learning dataset into a single generalization category, "object". In other words, the generalization-object recognizer 13 learns the image recognition using a learning model of only one category of object to learn. The generalization-object recognizer 13 thus learns the image recognition by the learning method by which the known-object recognizer 12 learns the image recognition.

The known-object recognizer 12 can learn the image recognition by the learning methods as described in Ren et al., "Faster R-CNN: Towards Real-Time Object Detection with Region Proposal Networks", Neural Information Processing Systems (NIPS), 2015; and Li et al., "Fully Convolutional Instance-aware Semantic Segmentation", IEEE Conference on Computer Vision and Pattern Recognition (CVPR), 2017, for example. An external device may learn the image recognition. That is, the known-object recognizer 12 (generalization-object recognizer 13) may execute the image recognition learned by the external device.

Next, returning to FIG. 2, the output controller 14 outputs output information on the known object or the generalization object identified from the image (step S104). The output form of the output information may be optional. The output information includes, for example, at least one of the number of known objects, the number of generalization objects, positions of known objects, positions of generalization objects, bounding boxes surrounding known objects (object detection as described in Ren et al., "Faster R-CNN: Towards Real-Time Object Detection with Region Proposal Networks", Neural Information Processing Systems (NIPS), 2015), bounding boxes surrounding generalization objects, masks on the areas of known objects (instance segmentation as described in Li et al., "Fully Convolutional Instance-aware Semantic Segmentation", IEEE Conference on Computer Vision and Pattern Recognition (CVPR), 2017), and masks on the areas of generalization objects.

Figure 8:
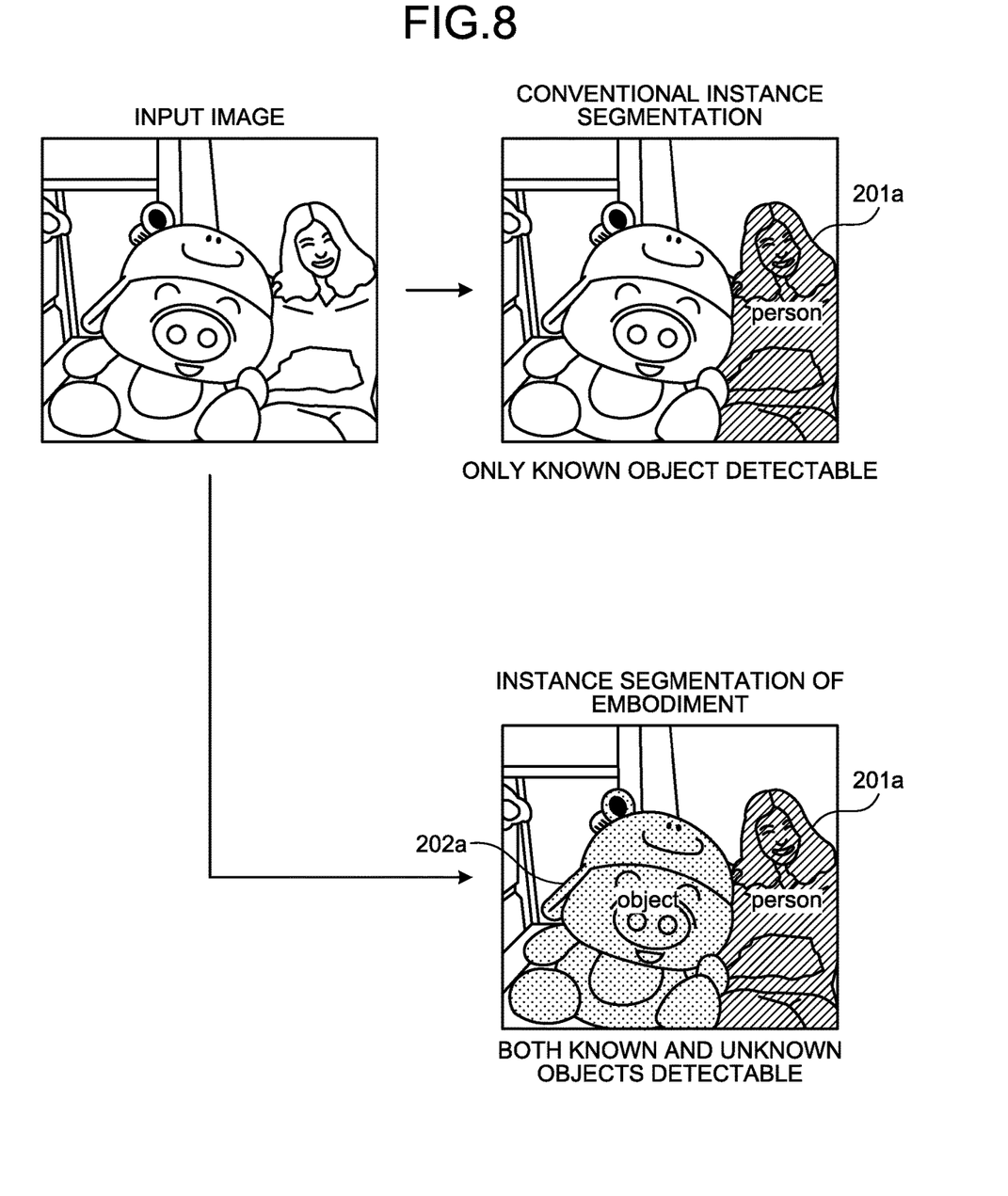
FIG. 8 is a diagram illustrating an example of output information of the embodiment.

FIG. 8 is a diagram illustrating exemplary output information of the embodiment. FIG. 8 shows the example of identifying objects using the masks (instance segmentation). Conventional instance segmentation works to detect only a known object 201a (person in the example of FIG. 8) that is identifiable as an object in the known category. In contrast, the instance segmentation of the embodiment can work to detect not only the known object 201a but also an unknown object (a stuffed animal in the example of FIG. 8) as a generalization object 202a in the generalization category "object".

Next, an exemplary functional configuration of the output controller 14 of the embodiment will be described.

Figure 9:
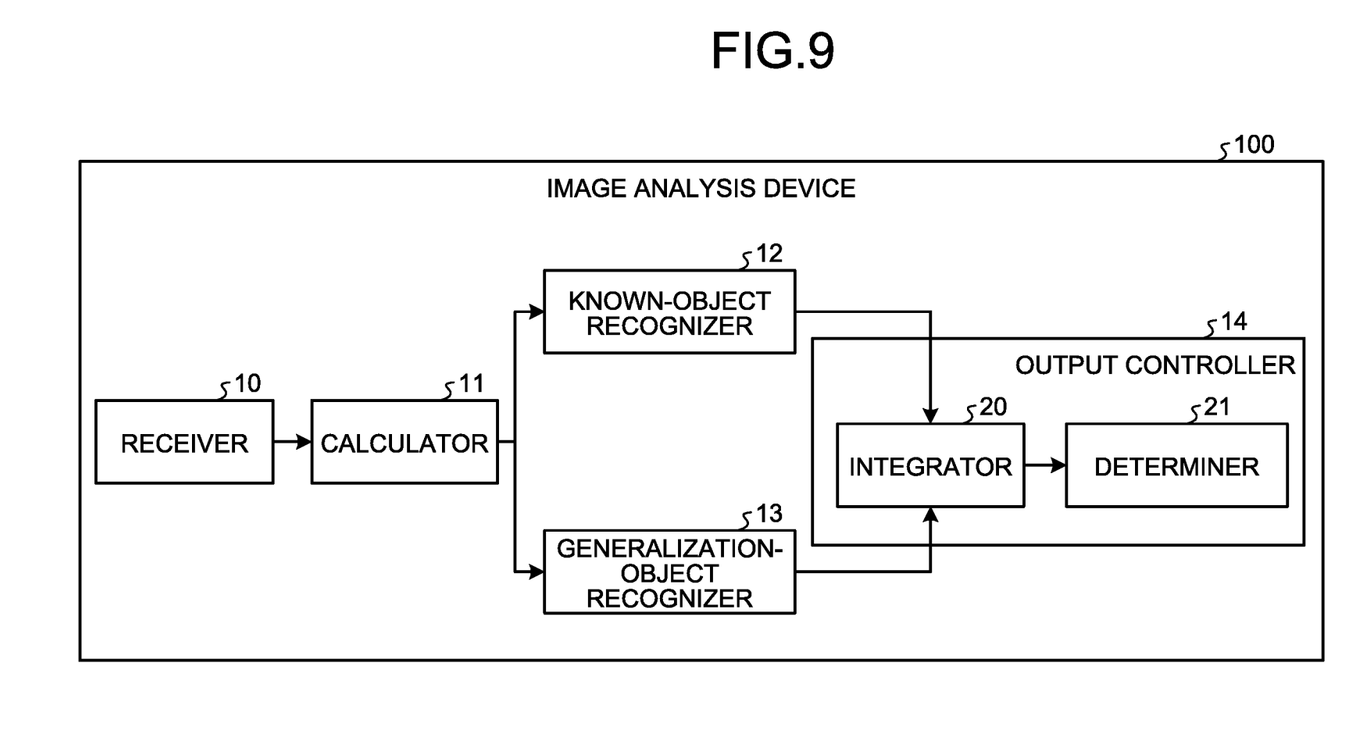
FIG. 9 is a diagram illustrating an exemplary functional configuration of an output controller of the embodiment.

FIG. 9 is a diagram illustrating an exemplary functional configuration of the output controller 14 of the embodiment. The output controller 14 includes an integrator 20 and a determiner 21.

The integrator 20 receives known-object data including the known object recognized by the known-object recognizer 12, from the known-object recognizer 12. The integrator 20 also receives generalization-object data including the generalization object recognized by the generalization-object recognizer 13, from the generalization-object recognizer 13. The integrator 20 then integrates the known-object data and the generalization-object data into integrated data.

When the position of the known object and the position of the generalization object in the integrated data match each other, the determiner 21 determines the object as a known object. When the position of the known object and the position of the generalization object in the integrated data do not match, the determiner 21 determines the object as a generalization object.

Figure 10:
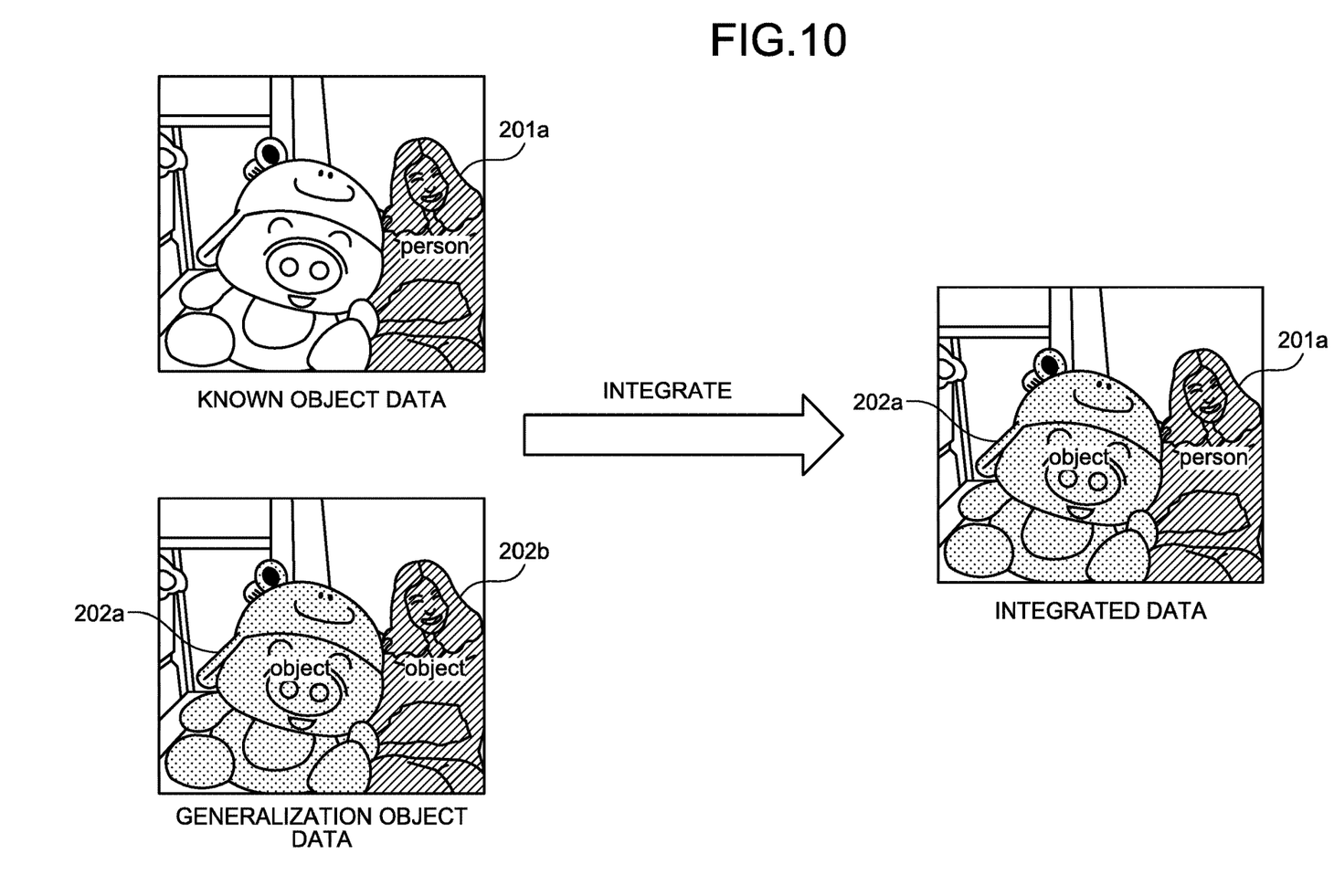
FIG. 10 is a diagram illustrating an exemplary integration process and determination process of the embodiment.

FIG. 10 is a diagram illustrating exemplary integration process and determination process of the embodiment. The known-object recognizer 12 recognizes a known object from the image on the basis of the above-described feature amount information. In the example of FIG. 10, the known-object recognizer 12 recognizes the person from the image as the known object 201a in the person category registered in the learning data of the image recognition, to thereby acquire known-object data. The generalization-object recognizer 13 recognizes a generalization object generalizable from the known object on the basis of the feature amount information. In the example of FIG. 10, the generalization-object recognizer 13 recognizes the stuffed animal and the person from the image as two generalization objects 202a and 202b in the generalization category "object", to thereby acquire generalization-object data.

The integrator 20 integrates, into integrated data, the known-object data including the known object recognized by the known-object recognizer 12 and the generalization-object data including the generalization object recognized by the generalization-object recognizer 13.

When the position of the known object and the position of the generalization object in the integrated data match each other, the determiner 21 determines the object as a known object. When the position of the known object and the position of the generalization object in the integrated data do not match, the determiner 21 determines the object as a generalization object. In the example of FIG. 10, the generalization object 202b recognized as the generalization category "object" and the known object 201a in the person category are recognized at the same position, so that the determiner 21 determines the object recognized at the position as the known object 201a. The known object is not recognized at the same position as the generalization object 202a recognized as the generalization category "object", so that the determiner 21 determines the object recognized at the position as the generalization object 202a.

The determination criterion of the determiner 21 is exemplary. The determiner 21 may determine whether the object is a known object or a generalization object by another criterion.

Figure 11:
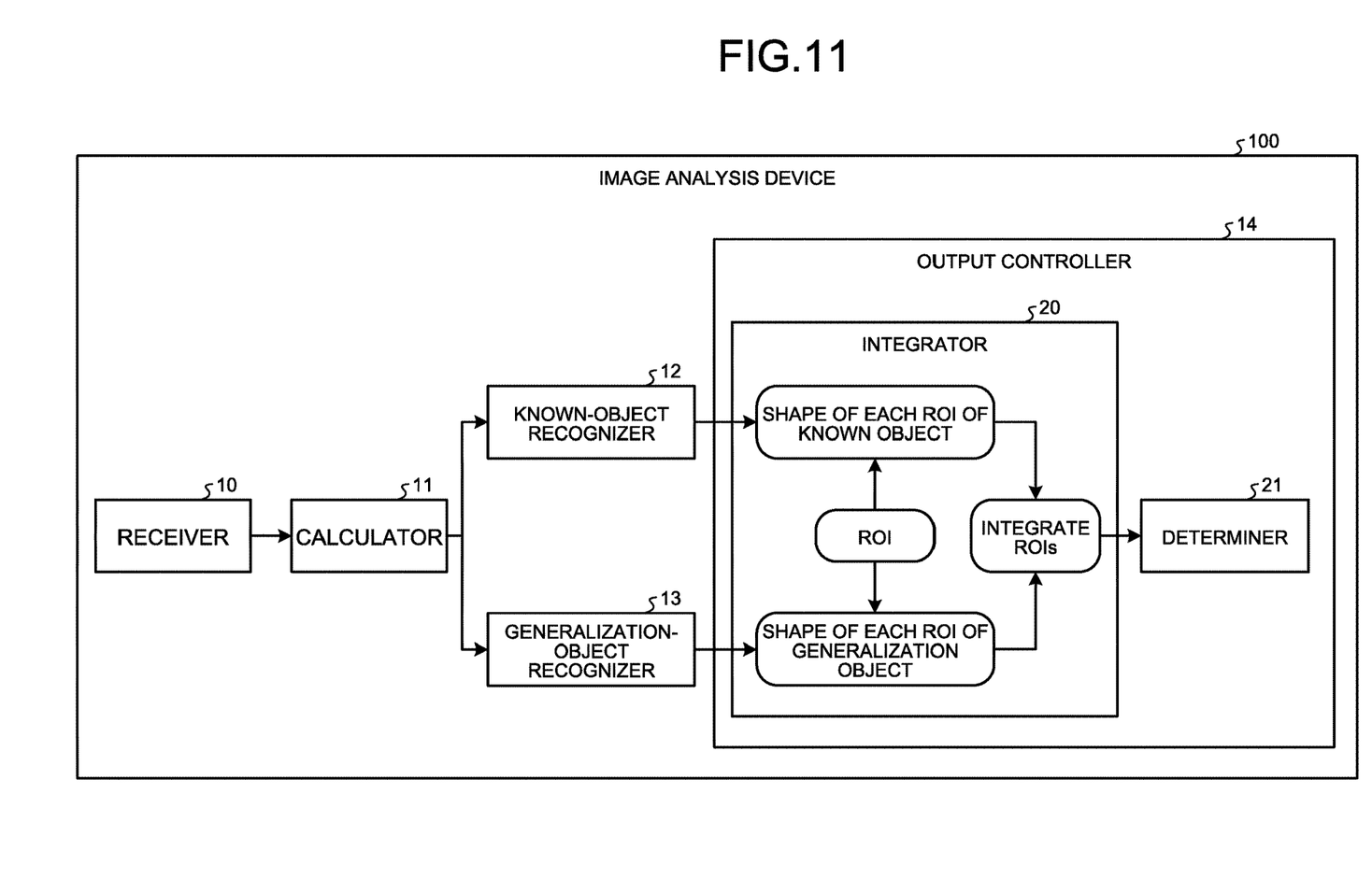
FIG. 11 is a diagram illustrating an exemplary process of the integrator of the embodiment.

FIG. 11 is a diagram illustrating exemplary processing of the integrator 20 of the embodiment. The integrator 20 integrates the known-object data and the generalization-object data of the integrated data in unit of region of interest (ROI) for object recognition. The determiner 21 then determines whether the position of the known object and the position of the generalization object match in each ROI.

Figure 12:
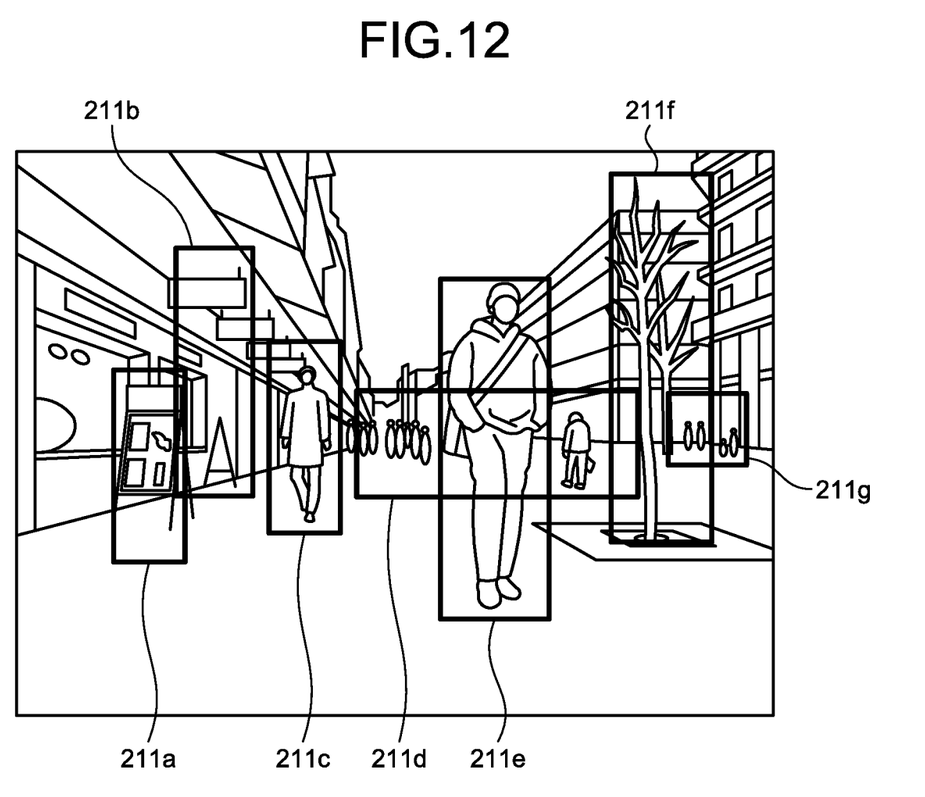
FIG. 12 is a diagram illustrating exemplary ROIs of the embodiment.

FIG. 12 is a diagram illustrating exemplary ROIs of the embodiment. FIG. 12 shows ROIs 211a to 211g by way of example, ROI detection method may be optional. For example, ROIs may be detected at preset positions. For another example, ROIs may be detected at any position on the basis of the feature amount map. ROIs are candidate regions (estimated regions) for object recognition, therefore, ROIs may include no objects to recognize.

As described above, according to the image analysis device 100 of the embodiment, the receiver 10 receives an image input. The calculator 11 calculates the feature amount information indicating the features of the region of the image. The known-object recognizer 12 recognizes from the image the known object registered in the learning data of the image recognition, on the basis of the feature amount information. The generalization-object recognizer 13 recognizes from the image the generalization object generalizable from the known object, on the basis of the feature amount information. The output controller 14 outputs the output information on an object identified from the image as the known object or the generalization object. Thereby, the image analysis device 100 of the embodiment can recognize unknown objects other than the known objects registered in the learning dataset as generalization objects. Moreover, the image analysis device 100 of the embodiment can recognize an unknown object as a generalization object without change in the learning data or the size of the network that calculates the feature amount information (for example, FIG. 3).

Lastly, an exemplary hardware configuration of the image analysis device of the embodiment will be described.

Exemplary Hardware Configuration

Figure 13:
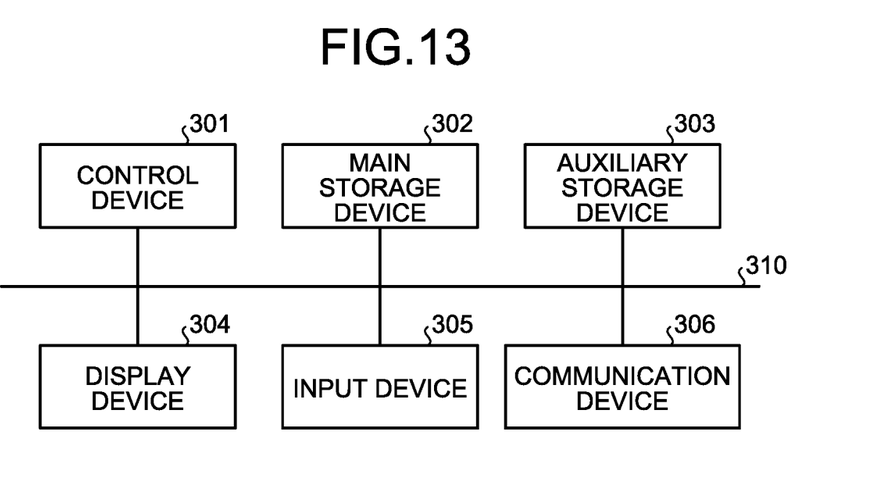
FIG. 13 is a diagram illustrating an exemplary hardware configuration of the image analysis device of the embodiment.

FIG. 13 is a diagram illustrating an exemplary hardware configuration of the image analysis device of the embodiment. The image analysis device of the embodiment includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a computer program read from the auxiliary storage device 303 to the main storage device 302. The main storage device 302 represents memory such as a read only memory (ROM) and a random access memory (RAM). The auxiliary storage device 303 represents a hard disk drive (HDD) or a memory card, for example.

The display device 304 displays display information. The display device 304 is a liquid crystal display, for example. The input device 305 is an interface for operating the image analysis device 100. The input device 305 is exemplified by a keyboard or a mouse. When the image analysis device 100 is a smart device such as a smartphone or a tablet terminal, the display device 304 and the input device 305 are a touch panel, for example. The communication device 306 is an interface for communicating with other devices.

Programs to be executed by the image analysis device 100 of the embodiment are recorded in installable or executable file format on a computer readable storage medium such as a compact disc-read only memory (CD-ROM), a memory card, a compact disc-recordable (CD-R), and a digital versatile disc (DVD) and provided as a computer program product.

Programs to be executed by the image analysis device 100 of the embodiment may be stored in a computer connected to a network such as the Internet, and downloaded and provided via the network. Programs to be executed by the image analysis device 100 of the embodiment may be provided via a network such as the Internet without being downloaded.

The programs of the image analysis device 100 of the embodiment may be incorporated in advance in the ROM.

Programs to be executed by the image analysis device 100 of the embodiment have a modular configuration including functional blocks that can be implemented by a program, among the above functional blocks. As actual hardware, the control device 301 reads and executes the program from the storage medium to load the functional blocks on the main storage device 302. In other words, the functional blocks are generated on the main storage device 302.

Part or all of the functional blocks may be implemented not by software but by hardware such as an integrated circuit (IC).

In the case of using a plurality of processors to implement the functions, each of the processors may implement one or two or more of the functions.

The operational form of the image analysis device 100 of the embodiment may be optional. For example, the image analysis device 100 of the embodiment may operate as a cloud system on the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image analysis device, comprising one or more processors configured to:
    receive an image;
    calculate feature amount information indicating a feature of a region of the image;
    recognize a known object from the image based at least in part on the feature amount information, an identity of the known object included in learning data used as part of an image recognition training process;
    recognize an unknown object having no class or no category as a generalization object from the image based at least in part on the feature amount information and a plurality of features of a plurality of known objects included in the learning data, the plurality of features being combined to generate the generalization object;
    integrate known-object data and generalization-object data into integrated data that is a single image data piece in which the known-object data and the generalization-object data are superimposed, the known-object data comprising the known object recognized by the known-object recognizer, the generalization-object data comprising the generalization object recognized by the generalization-object recognizer;
    determine the known object when a position of the known object and a position of the generalization object in the integrated data match each other, and determine the unknown object as the generalization object when the position of the known object and the position of the generalization object in the integrated data do not match each other; and
    output object information of an object identified from the image as the known object or the unknown object.

2. The device according to claim 1, wherein the one or more processors:
    integrate the known-object data and the generalization-object data of the integrated data into regions of interest, and
    determine whether the position of the known object and the position of the generalization object match each other in each region of interest of the regions of interest.

3. The device according to claim 1, wherein the one or more processors recognize the generalization object by using a learning model, the learning model is configured to be used for recognizing the generalization object as a single object category.

4. The device according to claim 1, wherein the one or more processors identify the known object or the generalization object by a bounding box surrounding the known object or the generalization object.

5. The device according to claim 1, wherein the one or more processors identify the known object or the generalization object by a mask on an area of the known object or the generalization object.

6. The device according to claim 1, wherein
    the object information comprises at least one of a number of known objects, a number of generalization objects, a position of the known object, a position of the generalization object, a bounding box surrounding the known object, a bounding box surrounding the generalization object, a mask on an area of the known object, or a mask on an area of the generalization object.

7. An image analysis method, comprising:
    receiving an input image;
    calculating feature amount information indicating a feature of a region of the image;
    recognizing a known object from the image based at least in part on the feature amount information, an identity of the known object included in learning data used as part of an image recognition training process;
    recognizing an unknown object having no class or no category as a generalization object from the image based at least in part on the feature amount information and a plurality of features of a plurality of known objects included in the learning data;
    combining the plurality of features to generate the generalization object;
    integrating known-object data and generalization-object data into integrated data that is a single image data piece in which the known-object data and the generalization-object data are superimposed, the known-object data comprising the known object recognized by the known-object recognizer, the generalization-object data comprising the generalization object recognized by the generalization-object recognizer;
    determining the known object when a position of the known object and a position of the generalization object in the integrated data match each other, and determine the unknown object as the generalization object when the position of the known object and the position of the generalization object in the integrated data do not match each other; and
    outputting object information of an object identified from the image as the known object or the unknown object.

8. A computer program product comprising a non-transitory computer readable medium comprising programmed instructions, the instructions causing the computer to execute:
    receiving an input image;
    calculating feature amount information indicating a feature of a region of the image;
    recognizing a known object from the image based at least in part on the feature amount information, an identity of the known object included in learning data used as part of an image recognition training process;
    recognizing an unknown object having no class or no category as a generalization object from the image based at least in part on feature amount information and a plurality of features of a plurality of known objects included in the learning data, the plurality of features being combined to generate the generalization object;

integrating known-object data and generalization-object data into integrated data that is a single image data piece in which the known-object data and the generalization-object data are superimposed, the known-object data comprising the known object recognized by the known-object recognizer, the generalization-object data comprising the generalization object recognized by the generalization-object recognizer;

determining the known object when a position of the known object and a position of the generalization object in the integrated data match each other, and determine the unknown object as the generalization object when the position of the known object and the position of the generalization object in the integrated data do not match each other; and outputting object information of an object identified from the image as the known object or the unknown object.

* * * * *